Sept. 9, 1947.  W. J. MEANS  2,427,014
ORIENTING DEVICE
Filed July 30, 1943  2 Sheets-Sheet 1
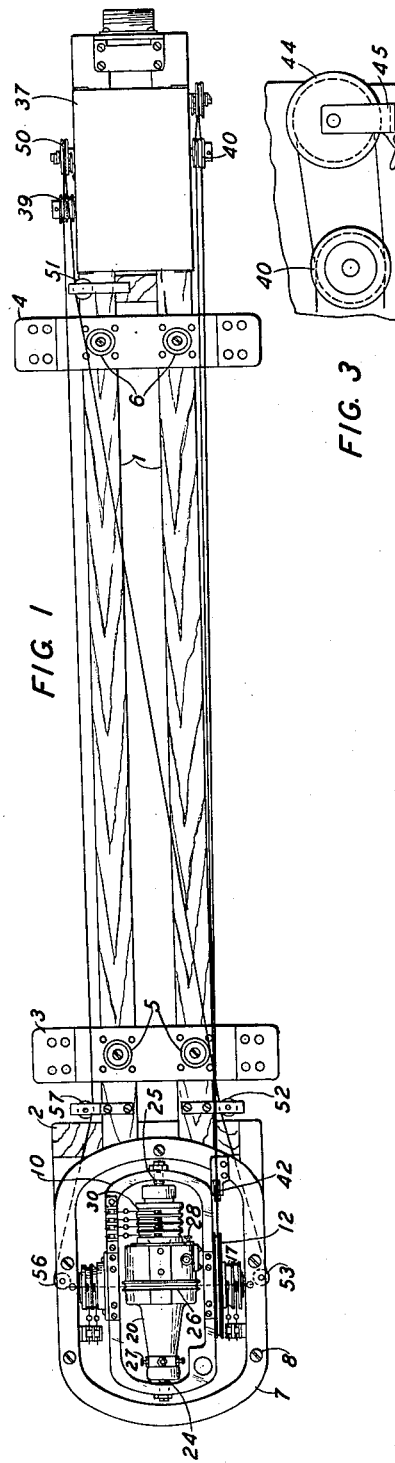
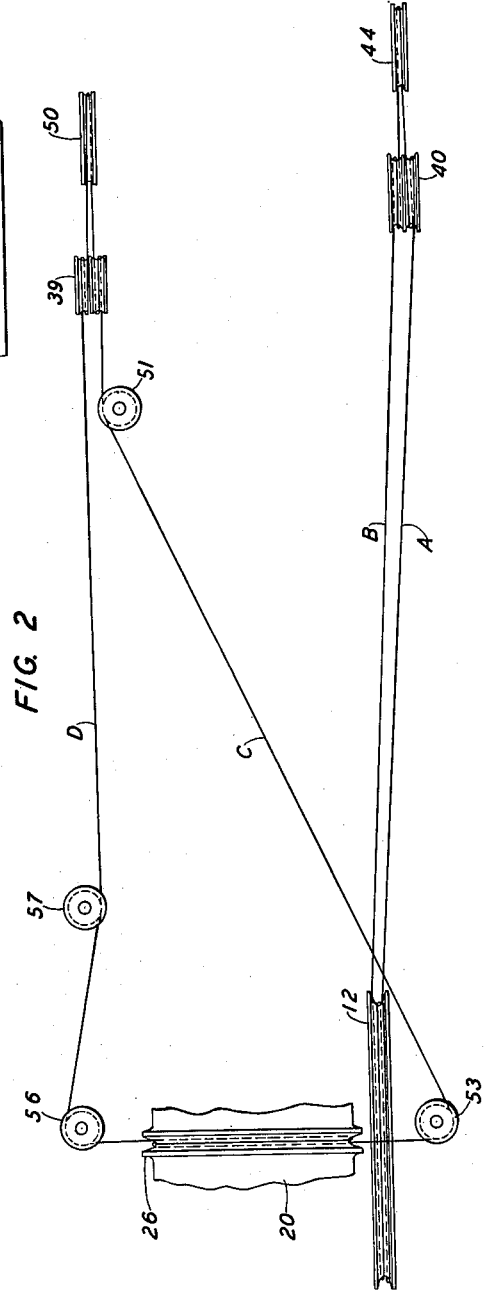
INVENTOR
W. J. MEANS
BY
J. F. McEneany
ATTORNEY

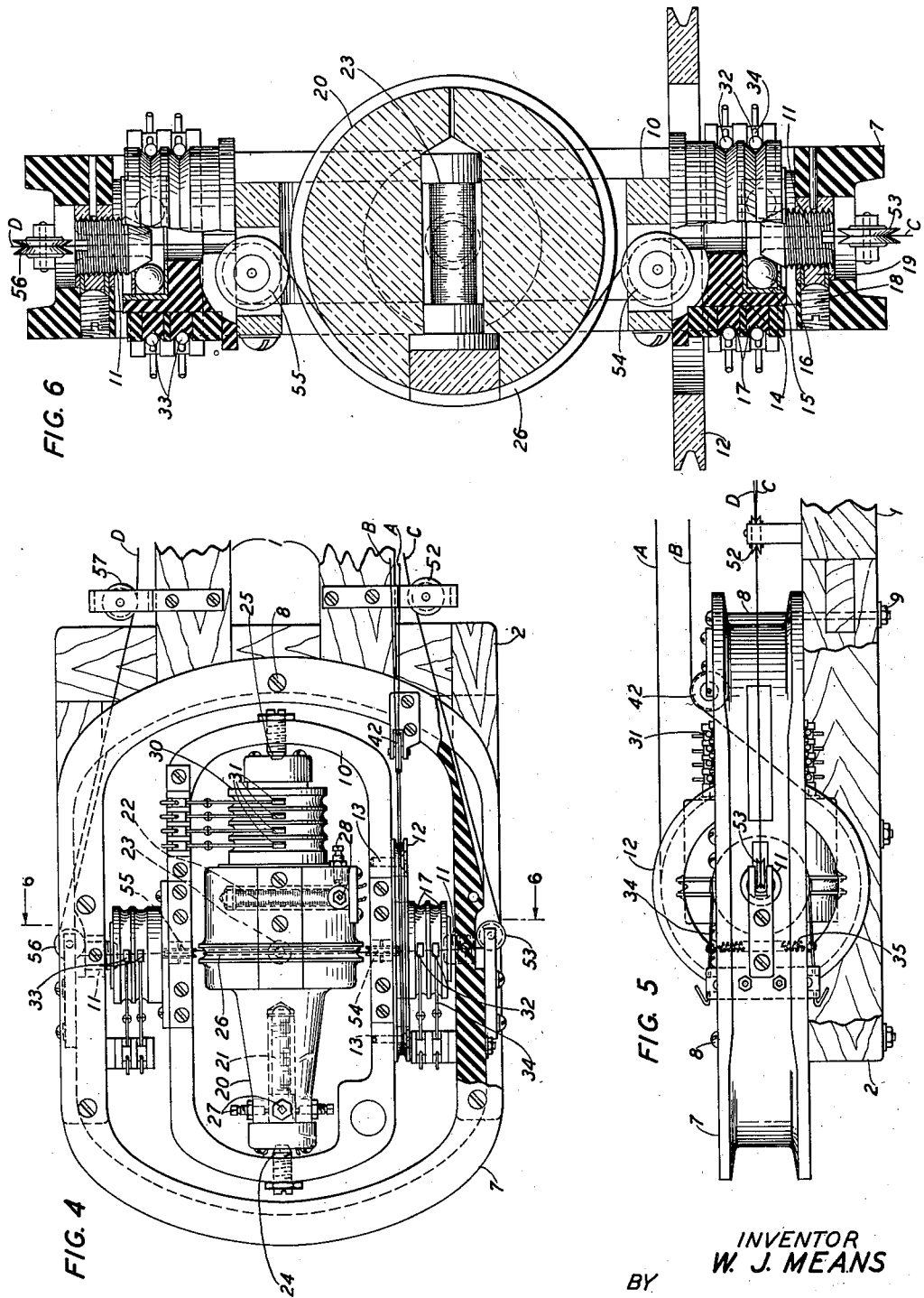

Patented Sept. 9, 1947

2,427,014

UNITED STATES PATENT OFFICE 2,427,014

ORIENTING DEVICE

Winthrop J. Means, Ridgewood, N. J., assignor to Bell Telephone Laboratories, Incorporated, New York, N. Y., a corporation of New York Application July 30, 1943, Serial No. 496,833

5 Claims. (Cl. 74—501)

This invention relates to devices for orienting a physical element in space and particularly to improvements permitting rotation of the physical element to be oriented in two directions normal to each other by driving means located externally of the orienting structure.

It is the object of this invention to provide an orienting structure in which a physical element may be independently rotated in two directions normal to each other through 360 degrees by separate, remotely located driving sources without interference between the rotating elements of the orienting structure and the drive coupling from the separate driving sources.

In magnetic field strength indicating devices of the type disclosed in United States patent application Serial No. 483,755, filed April 20, 1943, for E. P. Felch, Jr., and T. Slonczewski employing three magnetometers having their principal magnetic axes perpendicular, it is essential that no magnetic material which might affect the operation of the magnetometers be used in or in close proximity to the orienting mechanism of an orienting system capable of maintaining one of the mutually perpendicular magnetometers in substantial alignment with the magnetic field to be measured. As two separate sources of electromechanical energy are employed in the orienting system, the problem is presented, due to magnetic material present in the sources of electromechanical energy, of providing an orienting structure capable of producing independent rotation of a common supporting means for the three magnetometers through 360 degrees in two directions normal to each other from the two remotely located sources of electromechanical energy without interference between the rotating elements of the orienting structure and the separate drive couplings from the energy sources.

In accordance with the invention, a gimbal ring orienting structure is provided in which the supporting element for the magnetometers to be oriented is pivoted for rotation about its major axis within a gimbal ring which is in turn rotatably mounted on internally bored pivot bearings for rotation in a direction normal to the direction of rotation of the supporting element. Two sources of electromechanical energy mounted externally of the gimbal structure are coupled, one to the gimbal ring and one to the supporting element, by means of separate endless cords. One coupling cord engages a pulley attached to the outside of the rotatable gimbal ring. The second coupling cord extends from its source of energy to engagement with the supporting element through the internal bore in the pivot bearing for the rotatable gimbal ring.

While applicant discloses endless cord drive couplings between the energy sources and the rotatable elements of the orienting structure as a preferred form of coupling, other mechanical drive couplings in which the coupling element for the inner rotatable element extends through the outer rotatable element at the axis of rotation of the outer element, will come within the scope of this invention as defined in the appended claims. Another type coupling suitable for the purpose could utilize a rotatable shaft extending through the outer rotatable member at its axis of rotation, this shaft carrying a bevel gear in engagement with another bevel gear attached to the inner rotatable member.

The invention may be more clearly understood by referring to the accompanying drawings in which:

Fig. 1 is a plan view of the orienting mechanism and driving means mounted on a common support;

Fig. 2 shows the arrangement of driving cords and pulleys coupling the separate driving sources and the rotatable elements of the gimbal structure;

Fig. 3 is an enlarged view of one of the cord driving pulleys and a take-up pulley associated therewith;

Fig. 4 is an enlarged plan view, partly in section, of the orienting structure;

Fig. 5 is an elevation of the gimbal structure shown in Fig. 4; and

Fig. 6 is an enlarged section taken through line 6—6 of Fig. 4.

Referring to Fig. 1, a supporting base for the elements of the orienting mechanism comprises two parallel beams 1, having a U-shaped extension 2 at one end thereof. The beams 1 and extension 2 are made of non-magnetic material which in the present disclosure is shown to be wood. Transverse bars 3 and 4 attached to beams 1 by suitable shock-absorbing units 5 and 6 provide a convenient means for mounting the orienting structure to a suitable fixed support.

Referring to Figs. 1, 4 and 5, a fixed, outer gimbal ring 7, made of suitable non-magnetic material, is secured to extension 2 by means of several bolts 8 and nuts 9 (Fig. 5). An inner gimbal ring 10 is rotatably mounted within gimbal ring 7 on internally bored pivot bearings 11, secured to ring 7 in a manner to be disclosed hereinafter. An annular pulley 12 is secured to the outside of ring 10 by screws 13.

As shown in detail in Fig. 6, on diametrically opposite sides of ring 10 there are secured identical units each comprising a centrally bored member 14 forming a support for outer ball race 15 of ball bearing 16 and a set of two grooved slip rings 17 forming contact elements in an electrical circuit to magnetometers to be oriented.

An inner race for ball bearing 16 is formed by the tapered end of the internally bored pivot bearing 11. This bearing is in threaded engagement with the gimbal ring 7 for adjustment along its axis and may be secured in adjustment by means of set screw 18 and slidable, thread engaging block 19.

A common housing 20 is provided for three mutually perpendicular magnetometer elements, namely, an axial magnetometer 21, a transverse magnetometer 22 and a detector magnetometer 23. The detector magnetometer constitutes the physical element to be oriented in the magnetic field to be measured.

The housing 20, which may be formed from a solid piece of suitable plastic material, is provided at each end with a suitable ball bearing so that it may turn freely on its major axis on pivot bearings 24 and 25 carried by gimbal ring 10. Substantially midway of the ends thereof, the exterior surface of the housing 20 is formed into a grooved pulley section 26 for the reception of a driving element from a source of electromechanical energy as will be described hereinafter.

The detector magnetometer 23 fits into a circular recess therefor in housing 20 and is secured therein by a suitable cover plate and screw means (not shown). The mutually perpendicular relationship between the principal axes of the axial magnetometer 21, transverse magnetometer 22 and detector magnetometer 23 may be accurately obtained by means of adjusting screws 27 and 28 associated with the axial and transverse magnetometers, respectively.

A set of four grooved slip rings 30, similar to the slip rings 17, are provided on the surface of the housing 20 to be rotatable therewith. A winding on each of the magnetometers is electrically connected to the slip rings 30. By means of contact brushes 31 electrically connected to slip rings 17 and contact brushes 32 and 33 electrically connected to terminal posts on gimbal ring 7, these magnetometers are included in an electrical circuit to a source of exciting current of fundamental frequency. As will be seen, particularly in Figs. 5 and 6, each slip ring is contacted on diametrically opposite sides thereof by a contact brush. Each brush is mounted on individual pivoted levers 34 which are drawn together by coil spring 35. The contact brushes 31 for slip rings 30 are similarly mounted. The coil spring 35 assures good contact, since any disturbance tending to lift one of the contacts tends also to increase the pressure on the opposite one.

It will be understood that in the construction of this orienting structure no magnetic material is used other than the cores of the magnetometers. The housing 20 and gimbal rings 7 and 10 are made from some suitable plastic. The slip rings 17 and 30 are of fiber overlaid with copper and gold plated. The brush contacts 31, 32 and 33 are tipped with gold alloy. Other metal parts are of brass, copper or non-ferrous alloys.

On the end of the supporting base 1 opposite the orienting mechanism and approximately three feet therefrom, there is provided a housing 37 enclosing two individual sources of electromechanical energy each comprising a small two-phase motor. These motors each drive a pulley. These pulleys, which are designated by the numerals 39 and 40, are double-grooved pulleys as shown clearly in Fig. 2.

The operation of the orienting system for a magnetic field strength indicating device employing three magnetometers having their principal magnetic axes perpendicular is described in detail in the above-mentioned patent application filed for E. P. Felch, Jr., and T. Slonczewski. It is sufficient for an understanding of the operation of the orienting device herein di. losed to know that the three magnetometers 21 22 and 23 are each excited with voltages of fundamental frequency from an alternating current ource, and that should the axial magnetometer 21 or the transverse magnetometer 22 form an angle other than 90 degrees with the direction of the magnetic field to be tested, there will be induced therein a second harmonic voltage of magnitude and phase depending upon the magnitude and direction of angular displacement. The second harmonic voltages from these two magnetometers are converted in frequency and applied to one phase winding of their associated driving motors.

Displacement of the axial magnetometer 21 will cause the motor driving pulley 40 to rotate in one direction or the other to correct the displacement of this magnetometer as the pulley 40 is effectively coupled to the gimbal ring 10 through an endless driving cord A—B, pulley 12 and guide roller 42 secured to gimbal ring 7.

Displacement of the transverse magnetometer 22 will cause the motor driving pulley 39 to rotate in one direction or the other to correct the displacement of this magnetometer as this pulley 39 is effectively coupled to the housing 20 by means of an endless cord C—D and pulley section 26 on the housing 20.

The cord A—B, extending from one groove of pulley 40, is looped once around pulley 12 and then over one side of a guide roller 42 back to and around a second groove in pulley 40. From this second groove in pulley 40, the cord extends to and is looped around a tensioning roller 44 and back to the first groove of pulley 40. As shown in detail in Fig. 3, the tensioning pulley 44 is rotatable in pivoted arm 45 which is provided with several projections 46. Pulley 44 is urged in a clockwise direction by means of a coil spring 48 having one end anchored to a fixed shaft 49 and the other end engaging one of the projections 46. This arrangement of placing a tensioning pulley behind the driving pulley has the advantage that the driving cord is maintained in sufficient tension to insure good driving contact between the cord and pulleys without the introduction of elastic tensioning elements directly in the drive. Also by this arrangement the radial force exerted on the pulley shaft by the coupling cord C—D will be effectively balanced by an equal and opposite radial force exerted on the shaft by the cord engaging the tensioning pulley, thus minimizing thrust on the shaft bearing. A similar tensioning pulley 50 is provided for the driving cord C—D and pulley 39.

The driving cord C—D extends from pulley 39 to guide rollers 51, 52 and 53 and from there through the internal bore in one bearing 11 to guide roller 54 mounted on gimbal ring 10. From this last-named guide roller the cord C—D is looped once around housing 20 in pulley groove 26 and from there to engagement with a guide pulley 55 mounted in the gimbal ring 10. From this point the cord C—D extends through the internal bore in the other pivot bearing 11 back to pulley 39 by guided engagement with rollers 56 and 57.

There is no interference between the driving cord A—B and the driving cord C—D nor does this latter driving cord interfere with the complete rotation of the gimbal ring 10.

The feature of passing the endless cord C—D through one pivot bearing 11 to engagement with housing 20 and then, through the diametrically opposed pivot bearing 11 provides the advantage that while continuous rotation of inner gimbal ring 10 by cord A—B twists cord C—D, the twists in the two sides of this latter cord are in opposite directions so that, as the cord C—D moves, these twists meet and are eliminated. If continuous rotation of the inner gimbal ring 10 is not anticipated the cord C—D may be brought in and out through the same bearing.

By means of the arrangement of elements as presented applicant provides an orienting device incorporating novel features for producing rotation of a physical element through 360 degrees in two directions normal to each other by separate remotely located driving sources in which the possibility of interference between the rotating elements of the orienting structure and the driving couplings is eliminated.

What is claimed is:

1. An orienting device for orienting the principal axis of a physical element in space comprising in combination a gimbal structure having a gimbal ring rotatable about an axis, a physical element rotatably mounted within said gimbal ring about an axis normal to the axis of rotation of said ring, two sources of mechanical energy mounted externally of said gimbal structure, means coupling one of said sources of energy to said gimbal ring to produce rotation thereof about its axis and separate means coupling the other of said sources of energy to said physical element for producing rotation thereof about its axis of rotation, said last-mentioned coupling means extending through said gimbal ring at the axis of rotation thereof.

2. An orienting device for orienting the principal axis of a physical element in space comprising in combination a gimbal structure having a gimbal ring rotatable about an axis, a physical element rotatably mounted within said gimbal ring about an axis normal to the axis of rotation of said ring, two sources of mechanical energy mounted externally of said gimbal structure, means coupling one of said sources of energy to said gimbal ring to produce rotation thereof about its axis, means coupling the other of said sources of energy to said physical element to produce rotation thereof about its axis of rotation within said gimbal ring, said second means comprising an endless cord engaging said other source of energy and extending to driving engagement with said physical element through said gimbal ring at the axis of rotation thereof.

3. An orienting device for orienting the principal axis of a physical element in space comprising in combination a gimbal structure having a fixed gimbal ring provided with diametrically opposed internally bored pivot bearings, a second gimbal ring mounted for rotation on the pivot bearings in said fixed gimbal ring, a support for said physical element, said support being rotatably mounted within said second gimbal ring about an axis normal to the axis of rotation of said ring, two sources of mechanical energy mounted externally of said gimbal structure, means coupling one of said sources of energy to said second gimbal ring to produce rotation thereof about its axis, and coupling means between the other of said sources of energy and said support extending through the bored pivot bearings for said second gimbal ring in non-interfering relation with the rotation thereof about its axis of rotation.

4. An orienting device for orienting the principal axis of a physical element in space comprising in combination a gimbal structure having a fixed gimbal ring provided with diametrically opposed internally bored pivot bearings, a second gimbal ring mounted for rotation on the pivot bearings in said fixed gimbal ring, a first source of mechanical energy mounted externally of said gimbal structure, means comprising an endless cord coupling said first source of energy and said second gimbal ring to produce rotation thereof on said bearings, a physical element rotatably mounted within said second gimbal ring on bearings secured in said second ring, a second source of mechanical energy mounted externally of said gimbal structure, and means comprising an endless cord extending from said second energy source to driving engagement with said physical element through the internal bore in a pivot bearing for said second gimbal ring.

5. An orienting device for orienting the principal axis of a physical element in space comprising in combination a gimbal structure having a fixed gimbal ring supporting diametrically opposed internally bored pivot bearings therein, a rotatable gimbal ring mounted on said pivot bearings, a physical element rotatably mounted within said rotatable gimbal ring about an axis normal to the axis of rotation of said rotatable ring, and means for producing independent rotation of said rotatable gimbal ring and said physical element comprising a pair of externally mounted sources of mechanical energy each coupled to one of said rotatable elements by means of an endless cord, the endless cord coupling means for said rotatable physical element extending through one of said pivot bearings for said rotatable gimbal ring to engagement with said physical element and then through the other of said pivot bearings whereby twists produced in said cord by rotation of said gimbal ring are eliminated.

WINTHROP J. MEANS.

REFERENCES CITED

The following references are of record in the file of this patent:

UNITED STATES PATENTS

| Number | Name | Date |
|---|---|---|
| 1,936,576 | Barth | Nov. 28, 1933 |
| 1,694,477 | Long | Dec. 11, 1928 |